United States Patent
Tanaka et al.

(10) Patent No.: US 7,697,149 B2
(45) Date of Patent: Apr. 13, 2010

(54) SYSTEM FOR DETECTING AND AVOIDING PRINTING OF SOLID BLACK AREAS

(75) Inventors: Tomoyuki Tanaka, Concord, CA (US); Manuel A. Manalo, Concord, CA (US)

(73) Assignees: Kyocera Mita Corporation, Osaka-shi (JP); Kyocera Technology Development, Inc., Concord, CA (US)

( * ) Notice: Subject to any disclaimer, the term of this patent is extended or adjusted under 35 U.S.C. 154(b) by 1111 days.

(21) Appl. No.: 11/201,988

(22) Filed: Aug. 10, 2005

(65) Prior Publication Data

US 2007/0035761 A1   Feb. 15, 2007

(51) Int. Cl.
G06K 15/00    (2006.01)

(52) U.S. Cl. .................. 358/1.13; 358/3.26; 358/464; 358/448; 358/299; 349/142

(58) Field of Classification Search ................ 358/3.26, 358/464, 448, 299, 1.13; 349/142
See application file for complete search history.

(56) References Cited

U.S. PATENT DOCUMENTS

| | | | |
|---|---|---|---|
| 4,023,890 A * | 5/1977 | Shirasu et al. ............. 349/142 | |
| 4,788,535 A | 11/1988 | Chikara | |
| 5,349,377 A | 9/1994 | Gilliland | |
| 5,459,556 A | 10/1995 | Acquaviva | |
| 5,524,068 A * | 6/1996 | Kacandes et al. ........... 382/258 | |
| 5,825,986 A * | 10/1998 | Ferguson .................... 358/1.9 | |
| 5,848,225 A | 12/1998 | Nickell | |
| 5,898,819 A | 4/1999 | Austin | |
| 6,295,423 B1 * | 9/2001 | Haines et al. ................. 399/24 | |
| 6,297,796 B1 | 10/2001 | Letts | |
| 6,408,108 B2 * | 6/2002 | Hara et al. .................. 382/299 | |
| 6,473,521 B1 | 10/2002 | Hino | |
| 6,580,433 B2 | 6/2003 | Abe | |
| 7,110,147 B1 * | 9/2006 | Hayama et al. ............. 358/464 | |
| 7,298,900 B2 * | 11/2007 | Kanatsu ...................... 382/176 | |
| 2002/0051230 A1 * | 5/2002 | Ohta ........................... 358/448 | |
| 2002/0075501 A1 * | 6/2002 | Mantell et al. ............. 358/1.14 | |

(Continued)

FOREIGN PATENT DOCUMENTS

JP    5054188    3/1993

(Continued)

OTHER PUBLICATIONS

Microsoft Powerpoint User's Guide @1994 Microsoft Corporation, Document No. GB 62570-0694.*

*Primary Examiner*—Benny Q Tieu
*Assistant Examiner*—Qian Yang

(57) ABSTRACT

A method for processing a print page, by detecting if the page contains black areas exceeding a user-customizable coverage percentage, and providing a GUI for canceling, printing, and converting the print page. Printing presentation slides, for example, sometimes results in too many unattractive solid black sections, wasting toner or ink. When such a print page is detected, a user is alerted and allowed to convert the black areas, by inversion, dot-meshing, uniformly lightening page, lightening black regions, boundary preservation, and graduated lightening to lighten centers of solid black areas while leaving the contours intact. Methods also include specifying pixel blackness percentage based on grayscale and RGB values, previewing displaying contiguous black areas prominently, second detection step for contiguous areas, and processing PDL print objects by detecting and converting pen and brush colors.

20 Claims, 8 Drawing Sheets

U.S. PATENT DOCUMENTS

| | | | |
|---|---|---|---|
| 2002/0126300 A1* | 9/2002 | Abe et al. | 358/1.9 |
| 2003/0069712 A1* | 4/2003 | Saito | 702/127 |
| 2003/0231856 A1 | 12/2003 | Ikeda | |
| 2006/0274345 A1* | 12/2006 | Ferlitsch | 358/1.13 |
| 2006/0274376 A1* | 12/2006 | Bailey et al. | 358/3.26 |

FOREIGN PATENT DOCUMENTS

| | | |
|---|---|---|
| JP | 5130345 | 5/1993 |
| JP | 2000094750 | 4/2000 |

* cited by examiner

| 510 | Convert print page by uniformly lightening pixel grayscales in the print page (and dot-meshing) |

| 520 | Convert print page by inverting black and white of the print page |

| 530 | Convert print page by lightening pixel grayscale (and dot-meshing) black areas in the print page |

FIG. 5

| |
|---|
| 610    Start detection & conversion of black areas in a print page (inside StartPage & EndPage) |

| |
|---|
| 620    For print objects using pens (lines, curves, polygons)<br>Detection: check if the pen is black using RGB components; Calculate total black area<br>Conversion: change and lighten the pen color |

| |
|---|
| 630    For print objects using brushes (patterns, fills)<br>Detection: check if the brush is black using RGB components; Calculate total black area<br>Conversion: change and lighten the brush color |

| |
|---|
| 640    For print objects using bitmaps<br><br>Detection: The number of black pixels is considered for black area coverage processing.<br>(For an indexed pixel bitmap, an index to a color table is first converted into an RGB pixel.)<br><br>Conversion: change each pixel by dot-meshing or lightening. |

| |
|---|
| 650    Show the result of conversion in preview display<br>(Display contiguous black areas prominently: red, blinking, ... ) |

FIG. 6

710  Convert print page by dot-meshing (lightening pixels) black areas with edge preservation
For a black pixel in a black area,
IF ( ( x + y is even ) and ( all 8 surrounding pixels are black ) )
    THEN (lighten the pixel)
    ELSE (the pixel remains black)
720
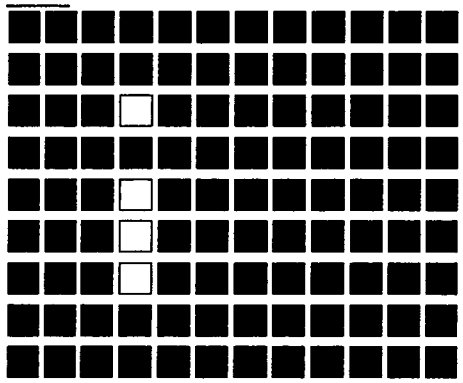
730
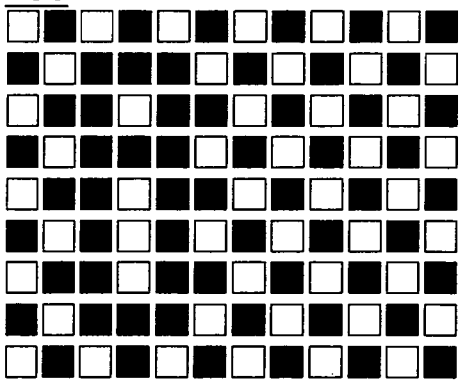
740
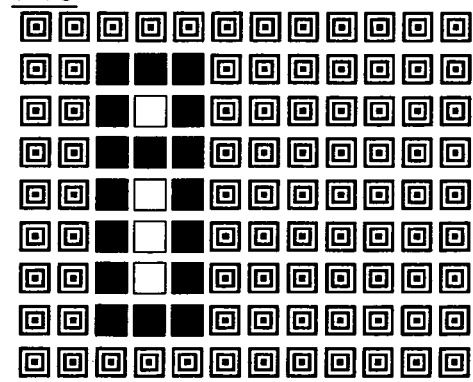
FIG. 7

810 Convert print page by dot-meshing (lightening pixels) black areas with graduated edge preservation
For a black pixel in a black area,
 the degree of lightening of the black pixel is proportional to
 the number of black pixels that contiguously surround the black pixel
820
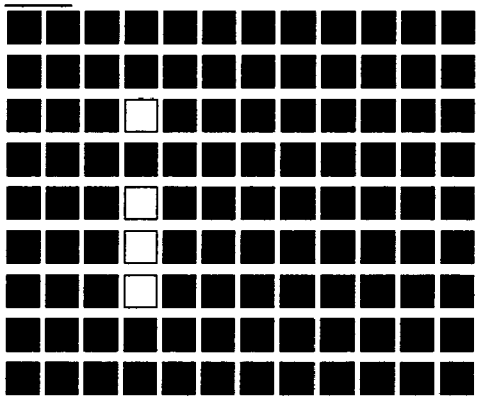
830
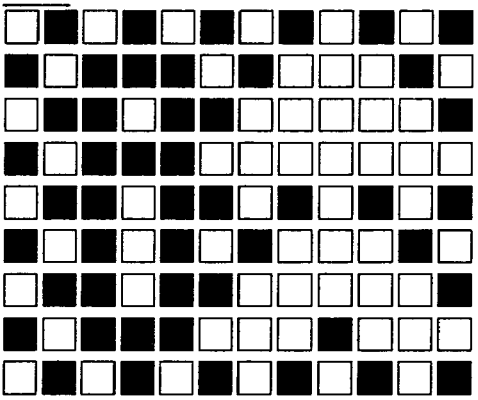
840
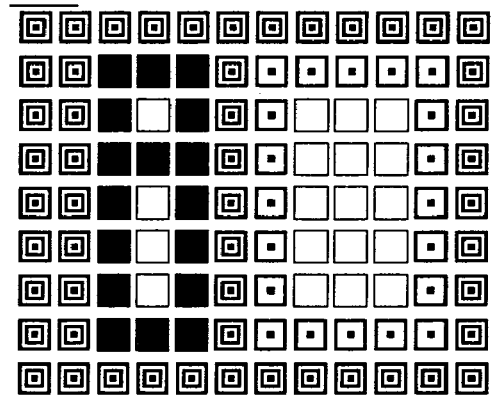
FIG. 8

SYSTEM FOR DETECTING AND AVOIDING PRINTING OF SOLID BLACK AREAS

CROSS-REFERENCES TO RELATED APPLICATIONS

Not Applicable

FEDERALLY SPONSORED RESEARCH

Not Applicable

SEQUENCE LISTING OR PROGRAM

Not Applicable

FIELD OF THE INVENTION

This invention relates to processing of print images, and more particularly to methods for detecting and avoiding printing of solid black areas in pages.

BACKGROUND OF THE INVENTION

Device drivers are generally known, including a printer driver. Typically, printing from a computer occurs through the use of a printer driver. Upon either an application launch or during a print command load time, the application will call an instance of the printer driver. When, for example, printing slide presentation documents, users often print pages with too many solid black areas, which are both an undesired result as well as waste of toner or ink. The present invention arose out of the above concerns associated with processing of print images and detecting and avoiding printing of solid black areas in pages.

SUMMARY OF THE INVENTION

Methods, computer program products, computing and printing systems for processing a print page, by detecting if the page contains black areas exceeding a user-customizable coverage percentage, and providing a GUI for canceling, printing, and converting the print page are described. Printing presentation slides, for example, sometimes results in too many unattractive solid black sections, wasting toner or ink. Printing of a page with too much black region is also common when using black-and-white inversion feature of the printer driver. When such a print page is detected, a user is alerted and allowed to convert the black areas, by inversion, dot-meshing, uniformly lightening page, lightening black regions, boundary preservation, and graduated lightening to lighten centers of solid black areas while leaving the contours intact. Methods also include specifying pixel blackness percentage based on grayscale and RGB values, previewing displaying contiguous black areas prominently, second detection step for contiguous areas, and processing PDL print objects by detecting and converting pen and brush colors.

A method is presented that allows a printer driver end-user to cancel or continue printing when the page to be printed is a "black" page. Printing black pages, which consumes a significant amount of printer consumable (toner or ink), is oftentimes not the desired output of the end-user. Black pages are especially common when printing presentation slides with dark-colored, solid background patterns.

The method primarily consists of a detection process and a feedback mechanism. The detection process analyzes the print data and decides whether a print page is black by utilizing two input parameters: the intensity of blackness (how black is black) and the amount of page coverage (how much of the page is black). A feedback mechanism in turn uses the output of the detection process: If a black page is detected, the feedback mechanism interrupts the print job and emits a graphic pop-up dialog box which asks the end-user to either cancel or continue printing. The printing process resumes after a choice has been made and takes the appropriate action. The output of the detection process becomes the input to the feedback mechanism. If a black page is detected based on the two input parameters set by the end-user, the feedback mechanism interrupts the printing process and emits a pop-up dialog box which informs the end-user that a black page has been detected, and asks the end-user to either cancel or continue printing the black page. The printing process resumes after a choice has been made and the appropriate action is taken based on that choice.

In an embodiment of the invention, the detection process is a host-based algorithm that is built into the PDL (Printer Description Language) modules of a printer driver. The basic objective is to determine whether a print page is black before it is even sent to a printer. This information is then passed to the feedback mechanism to provide the end-user the choice to cancel or continue printing via the GUI.

In a further embodiment of the invention, previewing allows a user to see the intermediate results of the various conversion methods available. When the user is satisfied with the appearance of the print page, the user can click on the [Print] button to initiate printing. The user can click on the [Cancel] button to cancel printing of the page.

The invention will be more fully understood upon consideration of the detailed description below, taken together with the accompanying drawings.

DESCRIPTION OF THE DRAWINGS

FIG. 5 is a flowchart showing the procedure for converting a print page, in accordance with a preferred embodiment of the present invention.

FIG. 6 is a flowchart showing the procedure for detecting and converting PDL print objects a print page, in accordance with a preferred embodiment of the present invention.

FIG. 7 illustrates methods and examples of lightening a black area with boundary preservation, in accordance with a preferred embodiment of the present invention.

FIG. 8 illustrates methods and examples of graduated lightening a black area with boundary preservation, in accordance with a preferred embodiment of the present invention.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
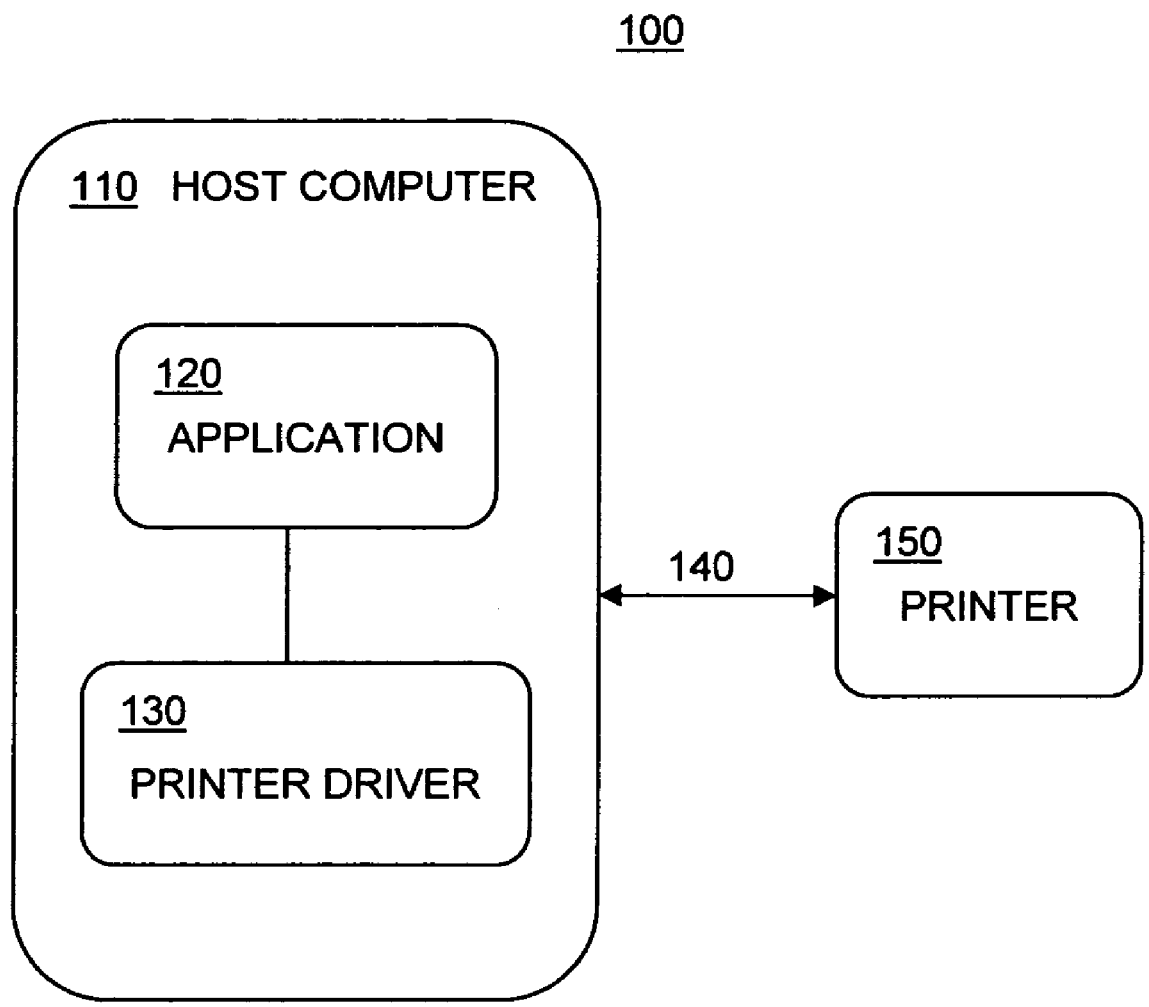
FIG. 1 is a simplified block diagram showing connection of a computing system to a printer.

FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer driver settings, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver settings, but they are to be understood as similarly applicable to other kinds of device drivers.

Figure 2:
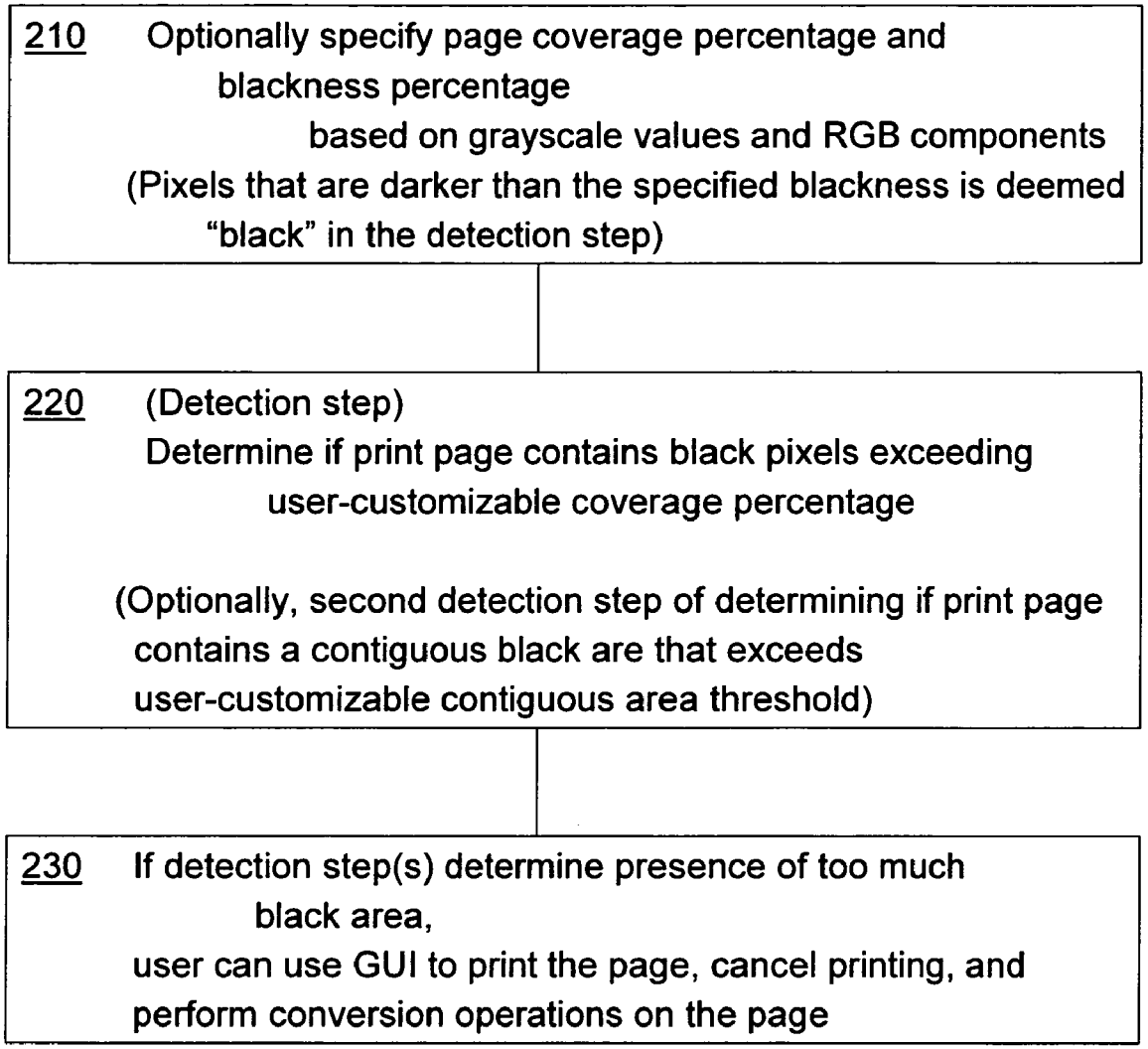
FIG. 2 is a flowchart showing the overall procedure of detecting and avoiding printing of solid black areas, in accordance with a preferred embodiment of the present invention.

FIG. 2 is a flowchart showing the overall procedure of detecting and avoiding printing of solid black areas, in accordance with a preferred embodiment of the present invention.

In step 210, a user can optionally specify the page coverage percentage and the blackness percentage based on grayscale values and RGB components. Before printing a document, the end-user enables the feature implemented by this invention, and may set two input parameters: the page coverage percentage and the intensity of blackness.

The amount of page coverage (how much of the page is black) specifies a percentage ranging from a very small percentage to 50% or 100% to determine the minimum fraction of the printable area of the physical page that contains black data for that particular page to qualify as a black page. For a letter-sized (8.5 in.×11 in.) page with a printable surface area of about 85 square inches, 50% translates to about 42.5 square inches of coverage. Setting the amount of page coverage to 50% means that if the printable area of the page has at least 50% black data, it is treated as a black page. In a typical printed page containing text, the percentage of black pixel coverage is less than about 6%. In typical embodiments of the invention, the page coverage percentages default to 10-20%.

Pixels that are darker than the specified blackness is deemed "black" in the detection step. In an embodiment of the invention, the default for this setting is such that only a completely black pixel (or print object color) is deemed "black" for the purpose of detecting black areas on the print page. If a user changes the blackness percentage, pixels that are dark enough are also taken to be black pixels. The intensity of blackness (how black is black) specifies a percentage ranging from typically 75% black to 100% black to determine the range of grayscale values that will be treated as black. For an 8-bit grayscale system with 256 levels of gray, wherein 0 is equivalent to black and 255 is equivalent to white, 75% black means a grayscale level of 64. Setting the intensity of blackness to 75% means all grayscale values from 0-64 are considered black. 100% black means a grayscale level of 0, and only this grayscale value is considered black.

In step 220 (the detection step), a determination is made if the print page contains black pixels exceeding user-customizable coverage percentage. In an embodiment of the invention, the detection process comprises the first method involving a Printer Description Language (PDL) based printer driver, and the second method involving a raster printer driver. A description of a raster printer driver detection process follows. For every print page (i.e. StartPage-EndPage pair), the detection process for a raster printer driver examines each raster bitmap page that corresponds to each print page on a per-pixel level. A print page is black if it satisfies a threshold value set by the combination of the two input parameters mentioned above: the intensity of blackness and amount of page coverage.

For color information, the RGB color space is used to determine whether a pixel is black. If the red, green and blue components of a pixel translate to a grayscale value that falls within the range of intensity levels of blackness set by the end-user, then it is a black pixel. All pixels of a given raster bitmap page are processed.

The cumulative total of all black pixels in the bitmap page is used to determine the coverage of black data in the print page the bitmap page corresponds to, as indicated by the following formula: (Surface area covered by black data)= (Total number of black pixels)/(Total number of pixels) If the result of the above formula is greater than or equal to the threshold value set by the end-user in the amount of page coverage parameter for a given page, then a black page has been detected.

In an embodiment of the invention, the detection step comprises an optional, second detection step of determining if print page contains a contiguous black areas that exceeds user-customizable contiguous area threshold. This threshold is typically specified as a certain number, say 2 or 3, of square inches (of solid, contiguous black area). The total contiguous black area in part includes the total contiguous black area pixels in a rasterized bitmap. The total contiguous black area also includes the total contiguous black area comprising PDL print objects using black pens and brushes. A combination of the two conditions (the amount of total black area and the amount of the contiguous black area) can be used to trigger alerting the user and bringing up the conversion and preview dialog screen. Various weighing of the two conditions can be used in the embodiments of the invention. Embodiments can simply use conjunction or disjunction of the two conditions. In an embodiment of the invention there is more emphasis on the first condition, while in another embodiment there is more emphasis on the second condition.

In step 230, if the detection step(s) determine presence of too much black area, the user can use GUI to print the page, cancel printing, and perform conversion operations on the page. The details of this step are described below.

Figure 3:
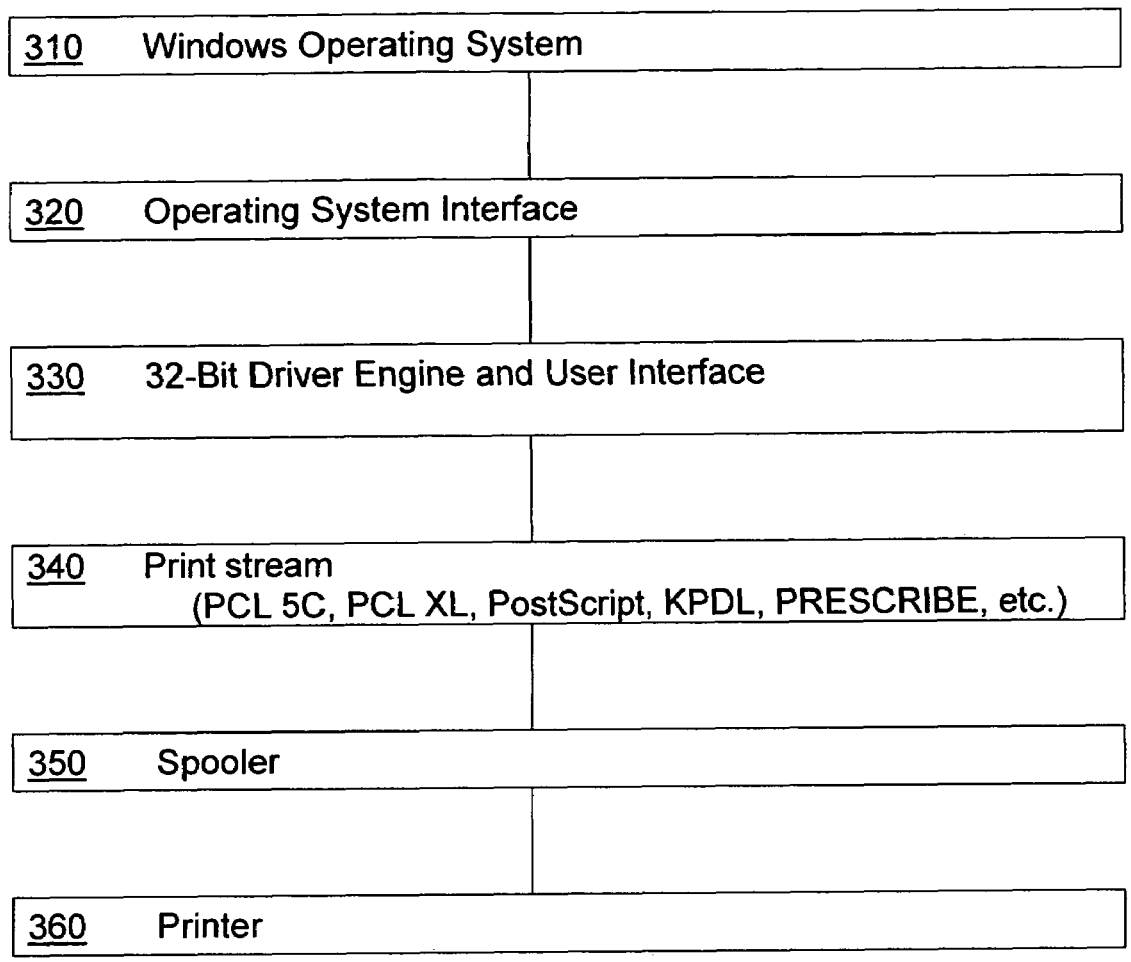
FIG. 3 is a block diagram showing the flow of print stream in a printing system, in accordance with a preferred embodiment of the present invention.

FIG. 3 is a block diagram showing the flow of print stream in a printing system, in accordance with a preferred embodiment of the present invention.

Windows operating system 310 provides an interface which includes a set of functions and structures to display graphical and text objects. This Operating System Interface 320 is known as the Graphics Device Interface (GDI) which the application uses to communicate with the printer driver through the 32-bit engine and user interface 330 provided in the driver.

When a document is printed using a printer driver, the application calls the driver using standard printing and drawing GDI API functions. The driver processes these calls first in its core portion which handles operating system specifics, and then depending on the type of printer driver, control is passed either to a selected PDL (Page Description Language or Printer Description Language) module or to a rendering module. While the rendering module produces a raster bitmap for each printed page of the document, the PDL module converts the drawing API function calls into PDL commands which the printer can understand.

The sequence of calls which the PDL module receives for an n-page document is as follows:

```
StartDoc( )
StartPage( ), page 1 <Drawing functions for each print object>
EndPage( ), page 1
...
StartPage( ), page n <Drawing functions for each print object>
EndPage( ), page n
EndDoc( ).
```

After the PDL module converts the drawing API function calls into PDL commands which the printer can understand, the result is a print stream 340 comprising commands of the PDL (PCL 5C, PCL XL, PostScript, KPDL, PRESCRIBE, etc.).

After a print stream 340 is produced, it is the job of the print spooler 350 to send the print stream (or related files) to the printer 360. When the spooler completes sending the print stream to the printer, the spooler deletes the temporary file(s) holding the output.

Figure 4:
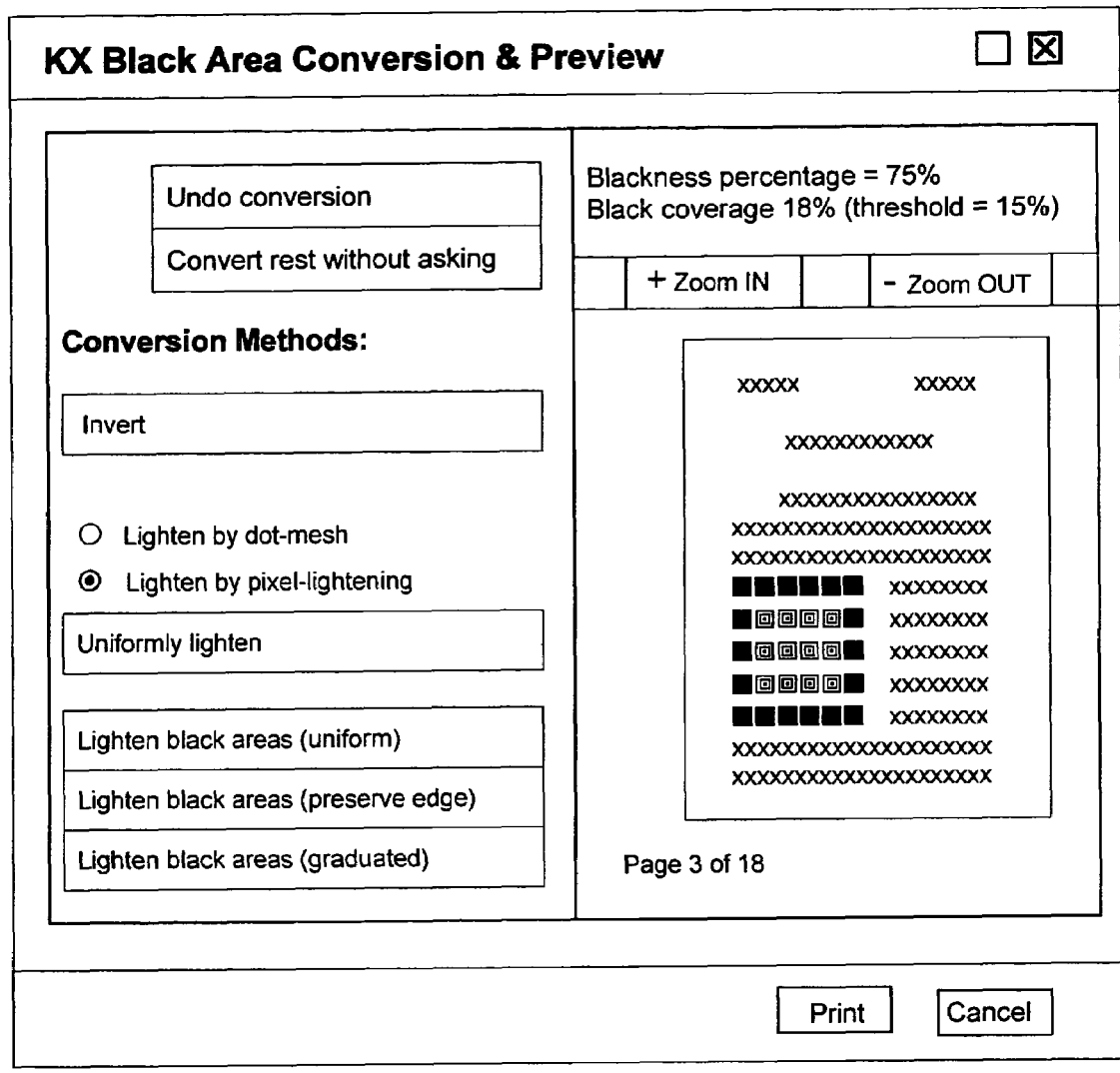
FIG. 4 is a view of the GUI for specifying printing, canceling, and converting a print page, in accordance with a preferred embodiment of the present invention.

FIG. 4 is a view of the GUI for specifying printing, canceling, and converting a print page, in accordance with a preferred embodiment of the present invention.

On the right side of the window is a preview display for showing the current page. The user can use the [Zoom In] and [Zoom Out] to obtain magnified and reduced images of the page. Above the preview display is shown some information about the current settings related to the methods of the invention, such as the page coverage percentage and the blackness percentage.

On the left side of the window is a list of buttons corresponding to the conversion methods for the print page: Invert black and white, Uniformly lighten the page, Dot-mesh black areas uniformly, Dot-mesh black areas with edge preservation, Dot-mesh black areas with graduated lightening, as well as three additional conversion methods that lighten the black areas in the page by lightening the pixels, namely, Lighten black areas uniformly, Lighten black areas with edge preservation, and Lighten black areas with graduated lightening. Radio buttons may be used to select between the lightening methods of lightening by dot-meshing and lightening by pixel-lightening. After a conversion is performed, the result is shown in the preview display.

The GUI provides methods for adjusting the parameters for these conversion methods, for example, by right-clicking on the conversion buttons. The parameters for the conversion methods includes how much to lighten the pixel when [Uniformly lighten] and [Lighten black areas (uniform)] is performed, and other parameters in the conversion methods described below.

On the left side, above the conversion buttons are two buttons for meta-actions. The first button (Undo conversion) is used to undo the last conversion performed. The second button (Convert rest without asking) is used to convert the rest of the print job in a similar manner to the conversion done to the present page. This button is used to specify that the all subsequent, similar pages are to be converted similarly to the current page, without the pop-up Conversion & Preview dialog to be displayed.

When the user is satisfied with the appearance of the print page, the user can click on the [Print] button to initiate printing. The user can click on the [Cancel] button to cancel printing of the page.

FIG. 5 is a flowchart showing the procedure for converting a print page, in accordance with a preferred embodiment of the present invention. FIG. 5 lists some of the conversion methods that are available in an embodiment of the invention. These methods can be applied to the print page in the order presented in the figure, and they can be applied in any order, or repeatedly.

In step 510, a user can convert the print page by uniformly lightening the pixel grayscale in the print page or dot-meshing. Monochrome and color pixels can be uniformly lightened by a certain degree that is specified by the user, resulting in the print page becoming generally lighter. Examples of the dot-meshing method are described below.

In step 520, a user can convert the print page by inverting black and white of the print page. This may be an obvious conversion method if the page is, for example, over 70% black. After an inversion, other conversion methods may be subsequently applied.

In step 530, a user can convert the print page by lightening pixel grayscale (or dot-meshing) black areas in the print page. Contiguous black areas in the print page can be identified for print objects using thick black pens or print objects using black brushes for patterns and fills. Alternatively, lightening of only contiguous black areas can be achieved using boundary preservation methods described below.

FIG. 6 is a flowchart showing the procedure for detecting and converting PDL print objects a print page, in accordance with a preferred embodiment of the present invention.

In step 610, the PDL printer driver detection process is started. For every print page (i.e. StartPage-EndPage pair), the detection process for a PDL-based printer driver examines all print objects for two pieces of information: color and surface area. A print page is black if it satisfies a threshold value set by the combination of the two input parameters mentioned above: the intensity of blackness and amount of page coverage. For the purposes of determining color information, the print objects can be classified into three categories: pens, brushes and bitmaps. The print objects are processed in the order in which they are received, and all print objects of a given page are processed.

For color information, the RGB color space is used to determine whether a print object is black. If the red, green and blue components of a print object translate to a grayscale value that falls within the range of intensity levels of blackness set by the end-user, that object is considered for surface area processing. Otherwise, processing for that object stops and the next object is processed.

Print objects using pens include vector drawings such as lines, curves and polygons (step 620). The process simply checks if the pen is black using its RGB components. Print objects using brushes include patterns and fills (step 630). Fonts and text belong to this group, as text color is rendered using a brush. The process simply checks if the brush is black using its RGB components. Total black areas of the print objects are calculated for the detection step. Conversion to lighten print objects using pens and brushes is accomplished by changing and lightening the pen and brush colors.

Bitmaps include all kinds of image data, and fall under two types: direct pixel (RGB) and indexed pixel (step 640). The processing of bitmaps is done on a per-pixel level. Each pixel is checked for color information to determine if it is a black pixel or not. If a bitmap has a sizeable number of black pixels, it is considered for surface area processing. A direct pixel bitmap has RGB pixels which can be readily checked. An indexed pixel bitmap has a color table as well as an array of indices to the color table, and each index represents a pixel. The process converts these indices into RGB pixels, which can then be checked.

The surface area of a print object is equivalent to the amount of black pixels the print object has. The cumulative surface area of all print objects in a print page determines whether the print page is black.

Each print object within each print page which qualifies for surface area processing based on its color information is considered. If there are no print objects to check (i.e. the page does not contain any black data at all), there is no surface area processing for the current print page and the next page is processed.

For the purposes of determining surface area information, the print objects can be classified into three categories: raster graphics, vector graphics, and text.

Raster graphics include bitmaps and JPEG images. Each bitmap or image has a fixed width and height. A bitmap's area is simply the product of its width and height, and its "black" surface area is the percentage of the area that is occupied by the black pixels.

Vector graphics include stroked objects and filled objects. A stroked object is drawn by a pen, while a filled object is rendered by a brush. The surface area of a stroked object is its perimeter multiplied by the thickness or width of the pen. For example, a circle with a ten-pixel diameter drawn using a black pen two pixels wide has a surface area equal to the circle's circumference (pix10) multiplied by 2.

The surface area of a filled object is simply its geometric area. If the same circle given in the preceding example is filled by a black brush, its surface area would be the circle's area (pix25). If a print object is both stroked and filled, then its surface area is the sum of the stroked object's surface area and the filled object's surface area.

For fonts and text objects rendered by a black brush, the surface area is approximated by the dimensions of each character, given by its character width and height.

If the cumulative surface area of all print objects in a print page is greater than or equal to the threshold value set by the end-user in the amount of page coverage parameter for a given page, then a black page has been detected.

In step 650, the current appearance of the print page can be displayed in a preview window, which may show an intermediate result after a conversion processing. Print objects that are found to constitute contiguous black areas in the preceding steps can be prominently displayed, for example, in a red color, blinking, etc. Alternatively, prominently displayed are the subset of the contiguous, black, print objects that are larger than the user-specified contiguous black area threshold.

FIG. 7 illustrates methods and examples of lightening a black area with boundary preservation, in accordance with a preferred embodiment of the present invention. The pseudocode 710 shows the method of converting a print page by dot-meshing or dot-hatching (and lightening pixels) black areas with boundary preservation (edge preservation). Note that contours and locations of the black areas need not be specifically determined, but that lightening of only contiguous black areas can be achieved using this boundary preservation method.

For a black pixel in the print page, if the sum of the horizontal coordinate and the vertical coordinate is even and all 8 surrounding pixels are black, then the pixel (in the center) is lightened, where lightening a pixel means making it white for dot-meshing, and making it gray for pixel-lightening. Otherwise the pixel remains black.

A sample, enlarged portion 720 of a print page includes mostly black pixels, with four white pixels that form what resembles the letter 'i' toward the left. Note that in an actual print page, the actual letter 'i' is almost never represented so small, with the width of only one pixel. The conversion methods are applied as if there are indefinitely more black pixels around and beyond the edge of the sample portion 720.

When the basic dot-meshing with boundary preservation of the pseudocode 710 is applied to the sample bitmap 720, the result is an image that is mostly meshed 730. The meshed (or hatched) portions this image produces a uniform gray area at a normal scale. The white pixels remain white. All the black pixels adjacent to white pixels remain black, leaving a contour or boundary around the white shape. Without this contour or boundary, the exact shape formed by white pixels is lost or blurred by the process of meshing.

Instead of dot-meshing, a uniform pixel-lightening method is also possible. This is accomplished by eliminating the condition about the sum of the horizontal and vertical coordinates in the pseudocode 710. When this pixel-lightening with boundary preservation method is applied to the sample bitmap 720, the result is an image that mostly consists of gray pixels 740. Similarly to the dot-meshing example 730, the white pixels remain white, and all the black pixels adjacent to white pixels also remain black, leaving a contour or boundary around the white shape.

The basic dot-meshing (pixel-lightening) with boundary preservation of the pseudocode 710 leaves a black contour of width one around a white shape. A contour of width two can be accomplished by replacing the box of dimensions 3 by 3 (a pixel and 8 surrounding pixels) in the basic method of the pseudocode 710 with the box of dimensions 5 by 5 (a pixel and 24 surrounding pixels).

FIG. 8 illustrates methods and examples of graduated lightening a black area with boundary preservation, in accordance with a preferred embodiment of the present invention. The pseudocode-like description 810 shows the method of converting a print page by graduated lightening. As in the boundary preservation method of the last figure, contours and locations of the black areas need not be specifically determined, but that lightening of only contiguous black areas can be achieved using this graduated lightening method.

For a black pixel, the degree of lightening of the black pixel is proportional to the number of black pixels that contiguously surround the black pixel. In a embodiment of the invention, the extent of lightening is monotonically, positively correlated with the number of black pixels that contiguously surround the black pixel. This is a natural extension of the basic edge preservation method of the pseudocode 710. The following example images illustrate this method in an embodiment of the invention using the following specifications. If a black pixel is adjacent to a white pixel (i.e., 3 by 3 box contains a white pixel), there is no lightening of the black pixel. Otherwise, if a black pixel's encompassing 5 by 5 box contains a white pixel, there is a small degree of lightening. Otherwise, if a black pixel's encompassing 7 by 7 box contains a white pixel, there is a greater degree of lightening. Otherwise, if a black pixel's encompassing 9 by 9 box contains a white pixel, there is a still greater degree of lightening. Otherwise (i.e., there is no white pixel in the black pixel's encompassing 9 by 9 box), there is complete lightening, i.e., the pixel becomes white. While the above description tests for mere presence of a white pixel, other embodiments of the invention can employ counting the number of white pixels in the encompassing boxes, and evaluating the overall lightness of the encompassing boxes by integrating the individual darkness of the constituent pixels of the encompassing boxes.

A sample, enlarged portion 820 of a print page includes mostly black pixels, with four white pixels that form what resembles the letter 'i' toward the left. This is identical to the sample portion described earlier 720, except that the edge of the sample portion 820 is treated as if there is another layer of black pixels surrounding the portion shown 820.

When a dot-meshing variant of the graduated lightening method is applied to the sample bitmap 820, the result is an image that is lighter at centers of formerly black areas 830. The black pixels adjacent to white pixels remain black, leaving a contour or boundary around the white shape. Degrees of lightening in the graduated lightening method can be achieved as follows in an embodiment of the invention. The darkest gradation is black. A lighter gradation is black for a pixel with sum of coordinates being even and white otherwise. A lighter gradation is black for a pixel with sum of coordinates being a multiple of 4 and white otherwise. A still lighter gradation is black for a pixel with sum of coordinates being a multiple of 8 and white otherwise. And so on.

When a pixel-lightening variant of the graduated lightening method is applied to the sample bitmap 820, the result is an image that is lighter at centers of formerly black areas 840. As in the other examples, the black pixels adjacent to white pixels remain black, leaving a contour or boundary around the white shape. There are two degrees of lightening in addition to complete lightening, i.e. turning a pixel white. This method allows large black areas to be mostly lightened while leaving white shapes sharp and also designating lightened areas recognizable as such to the user.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although this invention has been largely described using Windows terminology, one skilled in this art could see how the disclosed methods can be used with other operating systems, such as DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for processing a print page, while
   detecting, alerting, and avoiding printing of solid black areas in the print page, comprising
   percentage threshold value specifying step of presenting a GUI to a user by which the user specifies coverage percentage threshold value;
   and
   upon the user's specifying printing of a print page, performing detection steps comprising
   determining page-total black pixels in the print page, which comprises counting black pixels in at least one PDL print object for bitmaps, and calculating total black area of black pen and brush in at least one PDL print object by analyzing at least one PDL print object, to avoid rasterization of a PDL print object thus analyzed in case the user cancels printing of the print page, and to avoid rasterization of a PDL print object thus analyzed in its original form in case the user specifies converting the PDL print object;
   determining number of total pixels in the print page;
   determining coverage percentage for the print page, which is a percentage of the page-total black pixels in the print page to the number of total pixels in the print page;
   upon finding that the coverage percentage for the print page does not exceed the coverage percentage threshold value, printing the print page;
   upon finding that the coverage percentage for the print page exceeds the coverage percentage threshold value,
   alerting the user of undesirable and wasteful printing of overly dark print page, and
   presenting to the user a conversion and preview GUI, which lets the user specify printing the print page, converting the print page, or canceling of printing the print page.

2. The method of claim 1, further comprising a GUI for specifying blackness percentage based on grayscale values and RGB components, wherein the black pixels in the detection steps are pixels having darkness percentages that are greater than the specified blackness percentage.

3. The method of claim 1, wherein the GUI for specifying printing the print page, converting the print page, or canceling of printing the print page is presented if the detection steps determine that the print page contains black pixels exceeding a user-customizable coverage percentage; and wherein the GUI comprises a preview display for showing the print page, optionally displaying contiguous black areas in a visually prominent manner.

4. The method of claim 1, wherein the detection steps of determining if the print page contains black pixels exceeding a user-customizable coverage percentage comprises a secondary detection steps of determining if the print page contains a contiguous black area that exceeds a user-customizable contiguous area threshold.

5. The method of claim 1, wherein the converting the print page comprises uniformly dot-meshing and lightening pixel grayscales in the print page, dot-meshing and uniformly lightening black areas in the print page, and inversion of black and white of the print page.

6. The method of claim 1, wherein the detection steps of determining if the print page contains black pixels exceeding a user-customizable coverage percentage comprises—
classifying print objects into raster graphics and bitmaps, vector graphics, and text;
counting black pixels in at least one PDL print object for raster graphics and bitmaps;
calculating black surface area of stroked objects and filled objects in at least one PDL print object for vector graphics; and
approximating black surface area of fonts and text objects in at least one PDL print object by dimensions of each character, given by its character width and height.

7. The method of claim 1, wherein the converting the print page comprises selecting at least one PDL print object that contains black area; and lightening pixel grayscale of bitmaps, and lightening pen and brush colors of the at least one PDL print object.

8. The method of claim 1, wherein the converting the print page comprises lightening of contiguous black areas with boundary preservation wherein only a black pixel surrounded by all eight surrounding black pixels is lightened by lightening pixel grayscale and dot-meshing.

9. The method of claim 1, wherein the converting the print page comprises graduated lightening of contiguous black areas with boundary preservation wherein the degree of lightening of a black pixel by lightening pixel grayscale and dot-meshing is proportional to the number of black pixels that contiguously surrounds the black pixel.

10. A non-transitory computer-readable medium storing a computer program which is executable by a computer and which is relating to an operation of the image forming and printing apparatus for processing a print page, while detecting, alerting, and avoiding printing of solid black areas in the print page, comprising machine-readable code for causing a machine to perform the method steps of:
percentage threshold value specifying step of presenting a GUI to a user by which the user specifies coverage percentage threshold value;
and
upon the user's specifying printing of a print page, performing detection steps comprising
determining page-total black pixels in the print page, which comprises counting black pixels in at least one PDL print object for bitmaps, and calculating total black area of black pen and brush in at least one PDL print object by analyzing at least one PDL print object, to avoid rasterization of a PDL print object thus analyzed in case the user cancels printing of the print page, and to avoid rasterization of a PDL print object thus analyzed in its original form in case the user specifies converting the PDL print object;
determining number of total pixels in the print page;
determining coverage percentage for the print page, which is a percentage of the page-total black pixels in the print page to the number of total pixels in the print page;
upon finding that the coverage percentage for the print page does not exceed the coverage percentage threshold value, printing the print page;
upon finding that the coverage percentage for the print page exceeds the coverage percentage threshold value,
alerting the user of undesirable and wasteful printing of overly dark print page, and
presenting to the user a conversion and preview GUI, which lets the user specify printing the print page, converting the print page, or canceling of printing the print page.

11. The non-transitory computer-readable medium of claim 10, further comprising machine-readable code for causing a machine to perform the method step of providing a GUI for specifying blackness percentage based on grayscale values and RGB components, wherein the black pixels in the detection steps are pixels having darkness percentages that are greater than the specified blackness percentage.

12. The non-transitory computer-readable medium of claim 10, wherein the detection steps of determining if the print page contains black pixels exceeding a user-customizable coverage percentage comprises a secondary detection steps of determining if the print page contains a contiguous black area that exceeds a user-customizable contiguous area threshold.

13. The non-transitory computer-readable medium of claim 10, wherein the GUI for specifying printing the print page, converting the print page, or canceling of printing the print page is presented if the detection steps determine that the print page contains black pixels exceeding a user-customizable coverage percentage; wherein the GUI comprises a preview display for showing the print page, optionally displaying contiguous black areas in a visually prominent manner; and wherein the converting the print page comprises uniformly dot-meshing and lightening pixel grayscales in the print page, dot-meshing and uniformly lightening black areas in the print page, and inversion of black and white of the print page.

14. The non-transitory computer-readable medium of claim 10, wherein the detection steps of determining if the print page contains black pixels exceeding a user-customizable coverage percentage comprises—
classifying print objects into raster graphics and bitmaps, vector graphics, and text;
counting black pixels in at least one PDL print object for raster graphics and bitmaps;
calculating black surface area of stroked objects and filled objects in at least one PDL print object for vector graphics; and
approximating black surface area of fonts and text objects in at least one PDL print object by dimensions of each character, given by its character width and height;
wherein the converting the print page comprises selecting at least one PDL print object that contains black area; and lightening pixel grayscale of bitmaps, and lightening pen and brush colors of the at least one PDL print object.

15. The non-transitory computer-readable medium of claim 10, wherein the converting the print page comprises lightening of contiguous black areas with boundary preservation wherein only a black pixel surrounded by all eight surrounding black pixels is lightened by lightening pixel grayscale and dot-meshing; and graduated lightening of contiguous black areas with boundary preservation wherein the degree of lightening of a black pixel by lightening pixel grayscale and dot-meshing is proportional to the number of black pixels that contiguously surrounds the black pixel.

16. A computing system comprising a print engine, programmed to process a print page, while detecting, alerting, and avoiding printing of solid black areas in the print page, comprising percentage threshold value specifying step of presenting a GUI to a user by which the user specifies coverage percentage threshold value;

and upon the user's specifying printing of a print page, performing detection steps comprising determining page-total black pixels in the print page, which comprises counting black pixels in at least one PDL print object for bitmaps, and calculating total black area of black pen and brush in at least one PDL print object by analyzing at least one PDL print object, to avoid rasterization of a PDL print object thus analyzed in case the user cancels printing of the print page, and to avoid rasterization of a PDL print object thus analyzed in its original form in case the user specifies converting the PDL print object;

determining number of total pixels in the print page;

determining coverage percentage for the print page, which is a percentage of the page-total black pixels in the print page to the number of total pixels in the print page;

upon finding that the coverage percentage for the print page does not exceed the coverage percentage threshold value, printing the print page;

upon finding that the coverage percentage for the print page exceeds the coverage percentage threshold value, alerting the user of undesirable and wasteful printing of overly dark print page, and presenting to the user a conversion and preview GUI, which lets the user specify printing the print page, converting the print page, or canceling printing the print page.

17. The computing system of claim 16, further comprising a GUI for specifying blackness percentage based on grayscale values and RGB components, wherein the black pixels in the detection steps are pixels having darkness percentages that are greater than the specified blackness percentage; wherein the GUI for specifying printing the print page, converting the print page, or canceling of printing the print page is presented if the detection steps determine that the print page contains black pixels exceeding a user-customizable coverage percentage; and wherein the GUI for specifying printing the print page, converting the print page, or canceling of printing the print page comprises a preview display for showing the print page, optionally displaying contiguous black areas in a visually prominent manner.

18. The computing system of claim 16, wherein the detection steps of determining if the print page contains black pixels exceeding a user-customizable coverage percentage comprises a secondary detection steps of determining if the print page contains a contiguous black area that exceeds a user-customizable contiguous area threshold; and wherein the converting the print page comprises uniformly dot-meshing and lightening pixel grayscales in the print page, dot-meshing and uniformly lightening black areas in the print page, and inversion of black and white of the print page.

19. The computing system of claim 16, wherein the detection steps of determining if the print page contains black pixels exceeding a user-customizable coverage percentage comprises— classifying print objects into raster graphics and bitmaps, vector graphics, and text;

counting black pixels in at least one PDL print object for raster graphics and bitmaps;

calculating black surface area of stroked objects and filled objects in at least one PDL print object for vector graphics; and approximating black surface area of fonts and text objects in at least one PDL print object by dimensions of each character, given by its character width and height;

wherein the converting the print page comprises selecting at least one PDL print object that contains black area; and lightening pixel grayscale of bitmaps, and lightening pen and brush colors of the at least one PDL print object.

20. The computing system of claim 16, wherein the converting the print page comprises lightening of contiguous black areas with boundary preservation wherein only a black pixel surrounded by all eight surrounding black pixels is lightened by lightening pixel grayscale and dot-meshing; and graduated lightening of contiguous black areas with boundary preservation wherein the degree of lightening of a black pixel by lightening pixel grayscale and dot-meshing is proportional to the number of black pixels that contiguously surrounds the black pixel.

* * * * *